United States Patent
Cho et al.

(10) Patent No.: US 7,923,159 B2
(45) Date of Patent: Apr. 12, 2011

(54) WATER RECOVERY SYSTEM AND DIRECT LIQUID FEED FUEL CELL HAVING THE SAME

(75) Inventors: Hye-jung Cho, Anyang-si (KR); Hyuk Chang, Seongnam-si (KR); Kyoung Hwan Choi, Suwon-si (KR); Jae-yong Lee, Seongnam-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1064 days.

(21) Appl. No.: 11/515,900

(22) Filed: Sep. 6, 2006

(65) Prior Publication Data

US 2007/0087251 A1   Apr. 19, 2007

(30) Foreign Application Priority Data

Oct. 19, 2005 (KR) .................. 10-2005-0098665

(51) Int. Cl.
*H01M 8/06* (2006.01)

(52) U.S. Cl. ......... 429/413; 429/450; 429/456; 429/483

(58) Field of Classification Search ............. 429/34, 429/38, 39, 26, 30
See application file for complete search history.

(56) References Cited

U.S. PATENT DOCUMENTS

| | | | |
|---|---|---|---|
| 5,364,711 A | | 11/1994 | Yamada et al. |
| 6,180,274 B1 * | | 1/2001 | Yoshimoto et al. ............. 429/34 |
| 2003/0180594 A1 * | | 9/2003 | Choi et al. ...................... 429/32 |
| 2004/0076859 A1 | | 4/2004 | Gottesfeld |
| 2005/0074652 A1 * | | 4/2005 | Choi ............................... 429/32 |
| 2007/0042234 A1 * | | 2/2007 | Okuyama et al. ............... 429/12 |
| 2007/0087251 A1 | | 4/2007 | Cho et al. |

FOREIGN PATENT DOCUMENTS

| | | |
|---|---|---|
| CN | 1443379 A | 9/2003 |
| CN | 100517846 C | 7/2009 |
| JP | P2002-190310 A | 7/2002 |
| JP | 2003-36866 | 2/2003 |
| JP | 2003-288923 | 10/2003 |
| JP | 2005-100886 | 4/2005 |
| JP | 2006-4713 | 1/2006 |
| WO | WO 2004/012319 | 2/2004 |
| WO | WO 2004/102717 | * 11/2004 |

OTHER PUBLICATIONS

Certificate of Patent No. ZL200610064104.4 issued by the Chinese Intellectual Property Office on Jul. 22, 2009.
Japanese Office Action issued Mar. 16, 2010, in corresponding Japanese Patent Application No. 2006-241471.

* cited by examiner

*Primary Examiner* — Raymond Alejandro
(74) *Attorney, Agent, or Firm* — Lee & Morse, P.C.

(57) ABSTRACT

A water recovery system of a direct liquid feed fuel cell and a direct liquid feed fuel cell having the water recovery system. The water recovery system in which water produced at a cathode electrode of a membrane electrode assembly (MEA) is recovered to supply to an anode electrode, the water recovery system includes: a first member located on the cathode electrode and a first supporting plate that supports the first member; and a second member located on the anode electrode and a second supporting plate that supports the second member, wherein the first member and the second member are connected to each other through a slit formed in an electrolyte membrane of the MEA. The direct liquid feed fuel cell having the water recovery system can be used, for example, in a direct methanol fuel cell (DMFC).

16 Claims, 4 Drawing Sheets

WATER RECOVERY SYSTEM AND DIRECT LIQUID FEED FUEL CELL HAVING THE SAME

CROSS-REFERENCE TO RELATED APPLICATIONS

This application claims the benefit of Korean Patent Application No. 2005-98665, filed Oct. 19, 2005, in the Korean Intellectual Property Office, the disclosure of which is incorporated herein in its entirety by reference.

BACKGROUND OF THE INVENTION

1. Field of the Invention

Aspects of the present invention relate to a water recovery system of a direct liquid feed fuel cell, and more particularly, to a water recovery system for a direct liquid feed fuel cell that mixes water produced at a cathode electrode with a fuel supplied to an anode electrode.

2. Description of the Related Art

A direct liquid feed fuel cell is an apparatus that generates electricity via electrochemical reactions between an organic fuel, such as methanol or ethanol, and oxygen in the air as an oxidant. The electricity generated by the direct liquid feed fuel cell has high specific energy density and high current density. Also, since a liquid fuel, i.e., methanol, etc., is directly fed to the fuel cell, the direct feed fuel cell does not require a peripheral device such as a fuel reformer, and storing and supplying of the fuel are easy and economical.

As depicted in FIG. 1, a unit cell of a direct feed fuel cell has a membrane electrode assembly (MEA) structure having an electrolyte membrane 1 interposed between an anode electrode 2 and a cathode electrode 3. The anode and cathode electrodes 2 and 3 respectively include diffusion layers 22 and 32 for supplying and diffusing a fuel and oxidant, catalyst layers 21 and 31 at which oxidation and reduction reactions of the fuel occur, and electrode supporting layers 23 and 33. Reference numeral 4 indicates conductive plates that include flow channels 41 and 42 through which the fuel supplied to the anode and oxidant supplied to the cathode electrodes 2 and 3 flows, as well as exhaust constituents flowing from the anode and cathode electrodes.

An electrode reaction of a direct liquid feed fuel cell, such as a direct methanol fuel cell (DMFC), which is a direct liquid feed fuel cell that uses a mixture of methanol and water, includes an anode reaction where fuel is oxidized and a cathode reaction where hydrogen and oxygen are reduced as described below.

$$CH_3OH + H_2O \rightarrow CO_2 + 6H^+ + 6e^- \text{ (Anode reaction)} \quad \text{Reaction 1}$$

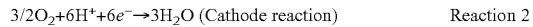

$$3/2 O_2 + 6H^+ + 6e^- \rightarrow 3H_2O \text{ (Cathode reaction)} \quad \text{Reaction 2}$$

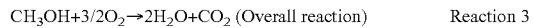

$$CH_3OH + 3/2 O_2 \rightarrow 2H_2O + CO_2 \text{ (Overall reaction)} \quad \text{Reaction 3}$$

At the anode electrode 2 where the fuel is oxidized (reaction 1), one carbon dioxide molecule, six hydrogen ions, and six electrons are produced for each methanol molecule consumed. The produced hydrogen ions migrate to the cathode electrode 3 through the electrolyte membrane 1. At the cathode electrode 3, water is produced by the reduction reaction (reaction 2) between hydrogen ions, electrons transferred through an external circuit, and oxygen. Accordingly, in the overall electrochemical reaction of the DMFC, water and carbon dioxide are produced by the reaction between methanol and oxygen (reaction 3).

The theoretical voltage that can be generated by a unit cell of a DMFC is approximately 1.2V. However, an open circuit voltage at an ambient temperature and at atmospheric pressure falls below 1V due to a voltage drop caused by an active surcharge and a resistance surcharge. In reality, an actual operating voltage lies in the range of 0.3~0.7V. Therefore, to obtain a higher voltage, a plurality of unit cells must be connected in series.

When a high concentration fuel is used, there is a large reduction of electricity output due to cross-over (a phenomenon where fuel passes through an ion exchange membrane) of the fuel through the electrolyte membrane (i.e., a hydrogen ion exchange membrane). Therefore, in a fuel cell, a liquid fuel mixed with water produced in the system or already stored in a water storage rather than a pure liquid fuel is used. However, when a low concentration fuel is used, the volume of a fuel tank must be large. A large fuel tank can hardly be applied to a small fuel cell system.

A mobile small fuel cell can be a monopolar type direct liquid feed fuel cell having a plurality of unit cells. However, to generate high density electricity, a high concentration fuel, for example, pure methanol can be used, and a water recovery system to recover water from a cathode electrode and to supply a dilute methanol to an anode electrode is required.

SUMMARY OF THE INVENTION

Aspects of the present invention provide a water recovery system for a direct liquid feed fuel cell. Aspects of the present invention also provide a direct liquid fuel cell having the water recovery system.

According to an aspect of the present invention, there is provided a water recovery system of a direct liquid feed fuel cell, in which water produced at a cathode electrode of a membrane electrode assembly (MEA) is recovered to supply to an anode electrode, the water recovery system comprising: a first member located on the cathode electrode and a first supporting plate that supports the first member; and a second member located on the anode electrode and a second supporting plate that supports the second member, wherein the first member and the second member are connected to each other through a slit formed at an electrolyte membrane of the MEA.

While not required in all aspects, the MEA may comprise a plurality of unit cells, and the slit may be formed in a length direction of the MEA.

While not required in all aspects, the first member and the second member respectively may each comprise main members corresponding to the slit and a plurality of side members extending perpendicularly to the main member from the main members.

While not required in all aspects, the first and/or second supporting plates may comprise grooves to which the side members are inserted, and the first and second supporting plates may comprise protruded guides that guide the main members.

While not required in all aspects, the first supporting plate may comprise paths to pass external air, and the paths do not contact the grooves.

While not required in all aspects, the second supporting plate may comprise paths to pass fuel, and the paths do not contact the grooves.

While not required in all aspects, the water recovery system may further comprise an air penetration membrane on the first supporting plate, wherein the air penetration membrane allows air to pass through but does not allow water produced at the cathode electrode to flow to an outside.

While not required in all aspects, the first and second supporting plates may be hydrophobic members or nonconductive metals, and the first and second members may be formed of a porous material.

According to another aspect of the present invention, there is provided a direct liquid feed fuel cell having a water recovery system, comprising: an MEA having an electrolyte membrane, a plurality of anode electrodes and cathode electrodes corresponding to each other respectively formed on opposite sides of the electrolyte membrane, and a water recovery system that supplies water recovered from the cathode electrode to the anode electrode of the MEA, wherein the water recovery system comprises: a first member located on the cathode electrode and a first supporting plate that supports the first member; and a second member located on the anode electrode and a second supporting plate that supports the second member, the first member and the second member are connected to each other through a slit formed in the electrolyte membrane of the MEA.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
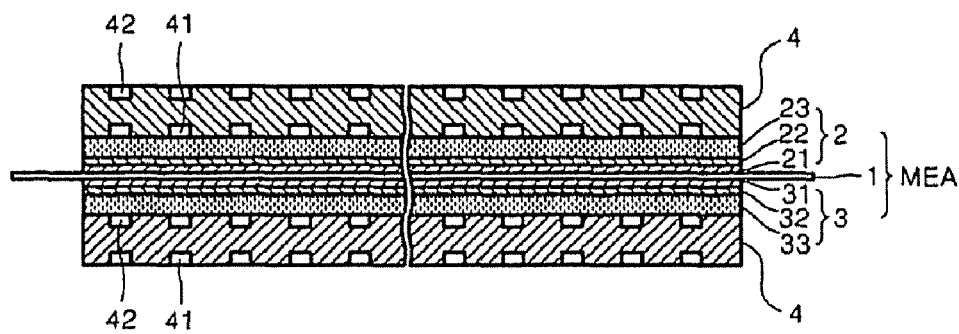
FIG. 1 is a cross-sectional view of a conventional unit cell structure for a direct liquid feed fuel cell.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
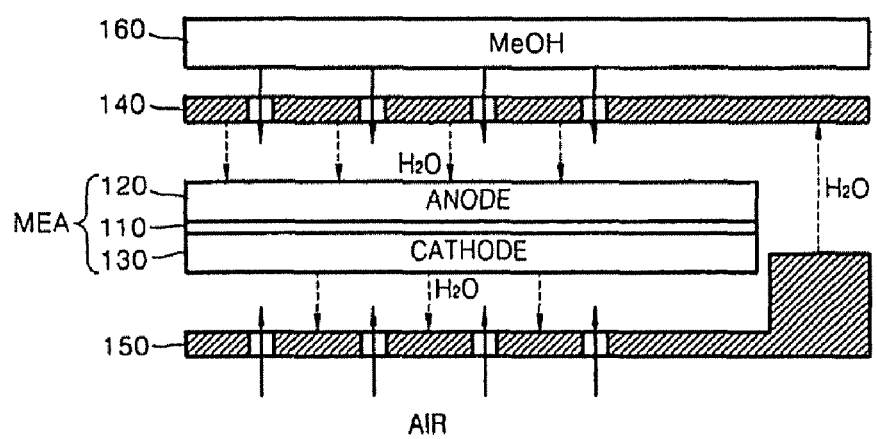
FIG. 2 is a schematic drawing of a configuration of a water recovery system for a direct liquid feed fuel cell according to an embodiment of the present invention.

FIG. 2 is a schematic drawing of a configuration of a water recovery system for a direct liquid feed fuel cell according to an embodiment of the present invention. Referring to FIG. 2, an anode electrode 120 and a cathode electrode 130 are respectively formed on opposite surfaces of an electrolyte membrane 110. The membrane 110, the anode electrode 120 and the cathode electrode 130 constitute a membrane electrode assembly (MEA).

Water recovery units 140 and 150 are located on opposite sides of the MEA. Water produced at the cathode electrode 130 flows into the water recovery unit 150 of the cathode electrode side, and the water recovery unit 150 of the cathode electrode side supplies water to the water recovery unit 140 of the anode electrode side. The water recovery unit 140 of the anode electrode side supplies water to the anode electrode 120, and, at this time, the water is mixed with a fuel that has by-passed the water recovery unit 140 of the anode electrode side from a fuel tank 160 through a diffusion layer (refer to 22 in FIG. 1), and supplied to a catalyst layer (refer to 21 in FIG. 1). External air that has by-passed the water recovery unit 150 of the cathode electrode side is supplied to the cathode electrode 130.

Figure 3:
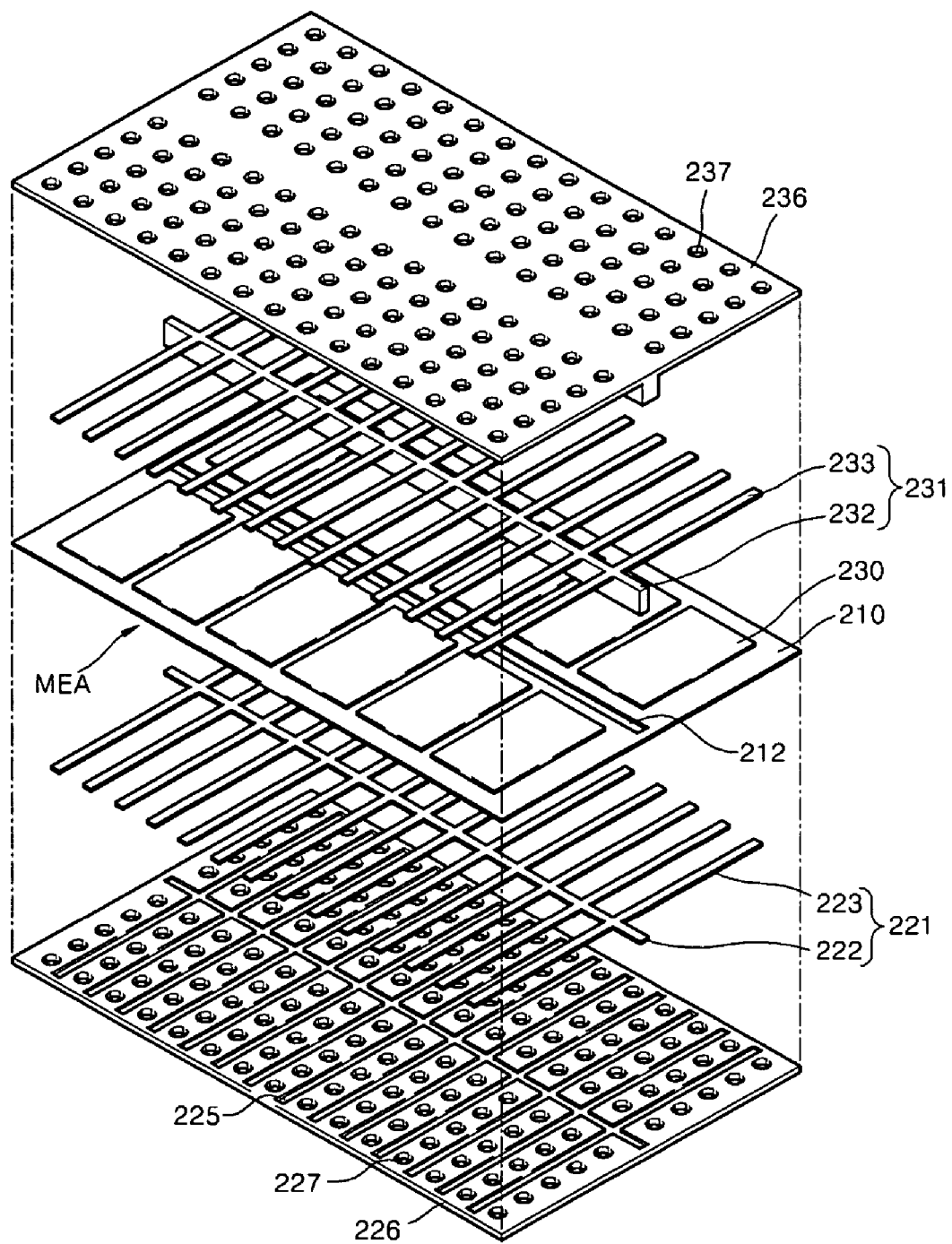
FIGS. 3 and 4 are respectively an exploded perspective view and cross-sectional view of a direct liquid feed fuel cell having a water recovery system according to an embodiment of the present invention.
Figure 4:
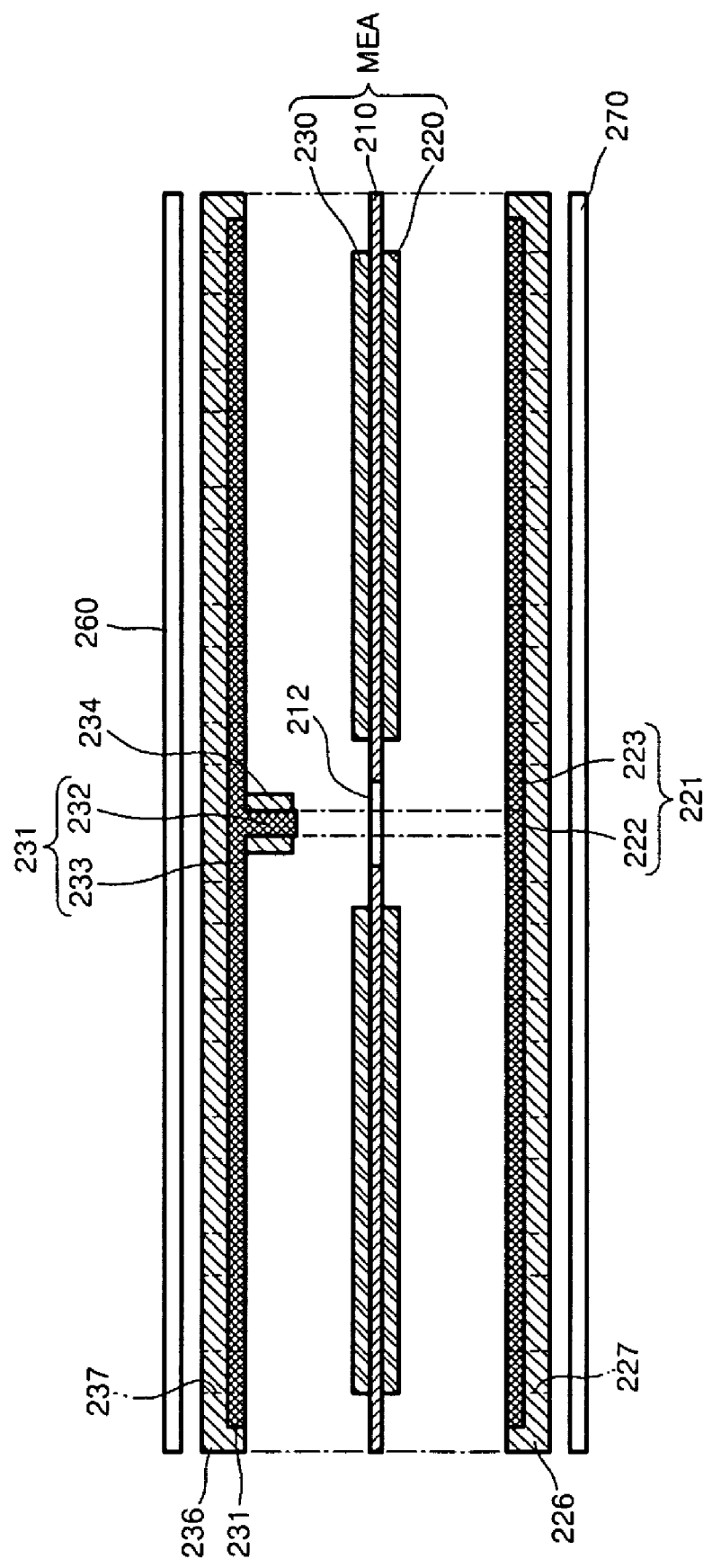
Figure 5:
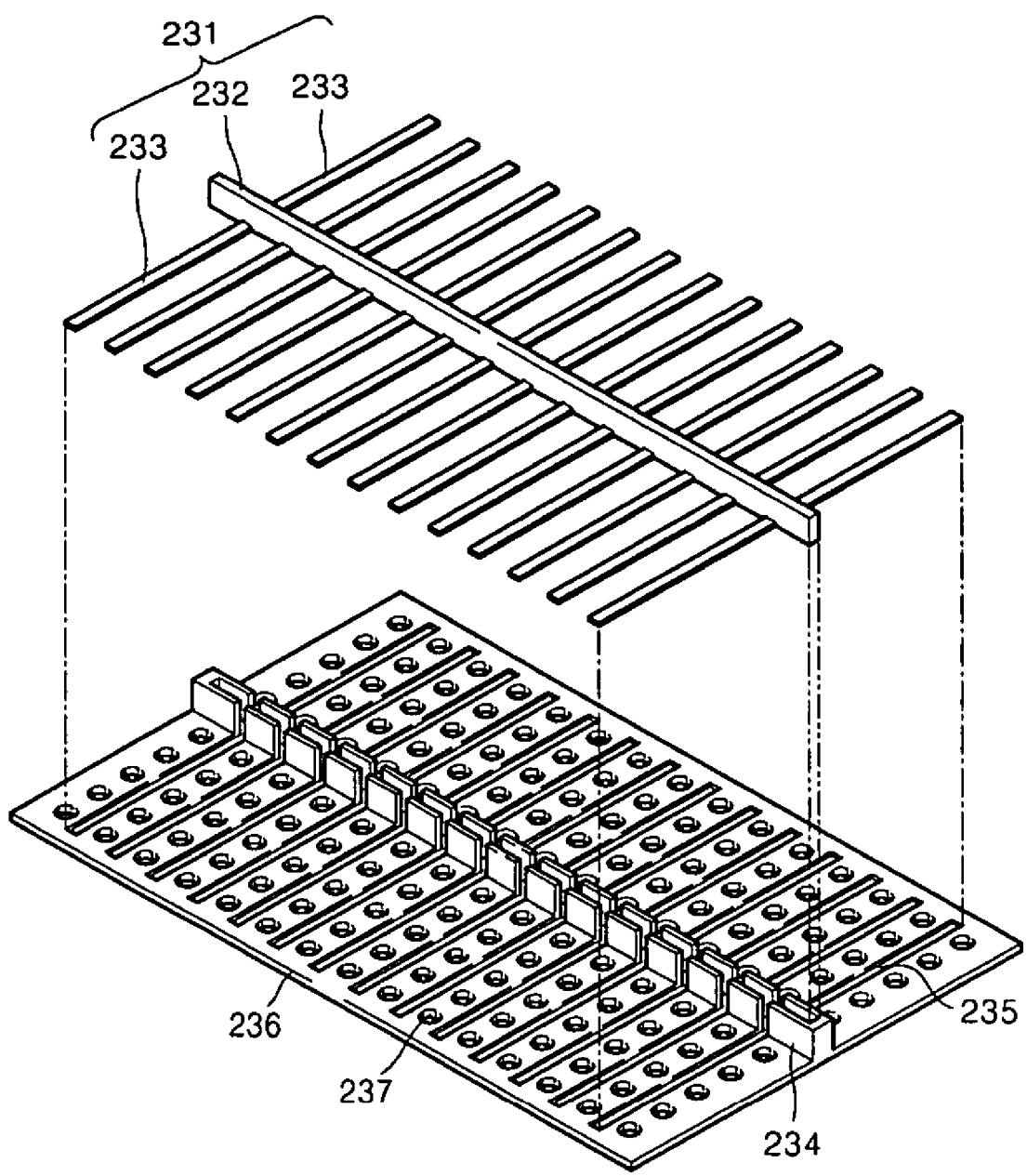
FIG. 5 is a partial perspective view of FIG. 3.

FIGS. 3 and 4 are respectively an exploded perspective view and cross-sectional view of a direct liquid feed fuel cell having a water recovery system according to an embodiment of the present invention. FIG. 5 is a partial perspective view of FIG. 3.

Referring to FIGS. 3 through 5, a water recovery system according to an embodiment of the present invention recovers water from a cathode electrode 230 of an MEA and supplies the water to an anode electrode 220. The MEA includes a plurality of unit cells, for example, twelve unit cells. The water recovery system includes a first member 231 located on the cathode electrode 230, a first supporting plate 236 that supports the first member 231, a second member 221 located on the anode electrode 220, and a second supporting plate 226 that supports the second member 221. The second member 221 and the first member 231 are connected to each other.

The first and second members 231 and 221 can be formed of a porous material, for example, sponge, and the first and second supporting plates 236 and 226 can be made of a hydrophobic material or a hydrophobic-treated material or a nonconductive metal. A membrane 210 of the MEA has a slit 212 in a length direction thereof. The first member 231 contacts the second member 221 through the slit 112. That is, water produced at the cathode electrode 230 is absorbed by the first member 231, and the first member 231 transfers the absorbed water to the second member 221.

The first member 231 and the second member 221 respectively include main members 232 and 222 corresponding to the slit 212 and a plurality of side members 233 and 223 extending toward the electrode from the main members 232 and 222.

The first supporting plate 236 includes paths to pass external air, for example, a plurality of air holes 237 and a vertical guide 234 that fixes the main member 232. Also, the first supporting plate 236 includes a plurality of grooves 235 that fixes the side members 233.

The second supporting plate 226 includes paths to pass a fuel, for example, a plurality of holes 227 and grooves 225 that fix the side members 223. The holes 227 are not contacted by the grooves 225. That is, from a fuel supplying point of view, the fuel may not directly contact the second member 221 that contains water. In other word, the holes 227 may be located between the grooves 225.

The first supporting plate 236 can further include an air penetration membrane 260, for example, a porous polytetrafluoroethylene (PTFE) membrane that allows air to pass through but does not allow water produced at the cathode electrode 230 to flow to an outside. Reference numeral 270 is a fuel tank which can be formed in various shapes and the detailed description thereof will be omitted.

Although the slit 212 and main members 232 and 222 are shown in FIGS. 3, 4, and 5 as located in the center of the MEA membrane 210, the present invention is not limited thereto, that is, in another embodiment the slit 212 and main members 232 and 222 can be located around the periphery of the MEA membrane 210. For example, FIG. 2 shows the water recovery unit of the cathode side 150 contacting the water recovery unit of the anode side 140 only on one side of the MEA membrane 110. In addition, the slit 212 is not particularly limited and may be another shape such as a round hole in the MEA membrane 210 and there may be a plurality of such round holes through which the first member 231 contacts the second member 221.

An operation of a water recovery system according to an embodiment of the present invention will now be described with reference to FIGS. 3 through 5.

Air that has passed through the air penetration membrane 260 is supplied to the cathode electrode 230 through the air holes 237 formed in the first supporting plate 236. Water produced at the cathode electrode 230 is absorbed by the side member 233 of the first member 231 and is transferred to the side member 223 of the second member 221 through both the main member 232 of the first member 231 and the main member 222 of the second member 221. Afterward, the water is supplied to the anode electrode 220 after being mixed with a fuel supplied through the second supporting plate 226. Accordingly, in the water recovery system according to an aspect of the present invention, water produced at the cathode electrode 230 is transferred to the anode electrode 220 to be used by mixing with a high concentration fuel.

As described above, a water recovery system of a direct liquid feed fuel cell according to aspects of the present invention can store a high concentration fuel in a fuel tank since water produced at a cathode electrode is mixed with the high concentration fuel supplied from the fuel tank by transferring the produced water to the anode electrode, thereby allowing the miniaturization of the fuel cell.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A water recovery system of a direct liquid feed fuel cell, in which water produced at a cathode electrode of a membrane electrode assembly is recovered to supply to an anode electrode, the water recovery system comprising:
    a first member comprising a main member extending lengthwise along the membrane electrode assembly and a plurality of side members extending perpendicularly at opposite sides of the main member, the first member absorbing water produced at the cathode electrode, and the first member being located on the cathode electrode;
    a first supporting plate that supports the first member;
    a second member supplying the water produced at the cathode electrode to the anode electrode, and the second member being located on the anode electrode; and
    a second supporting plate that supports the second member, wherein the first member and the second member directly contact each other through a slit formed at an electrolyte membrane of the membrane electrode assembly,
    wherein the first member transfers the water produced at the cathode electrode to the second member,
    wherein the main member is disposed in the slit formed on the electrolyte membrane of the membrane electrode assembly, and further comprising an air penetration membrane on the first supporting plate, the air penetration membrane allows air to pass through but does not allow water produced at the cathode electrode to flow to an outside.

2. The water recovery system of claim 1, wherein the membrane electrode assembly comprises a plurality of unit cells, and the slit formed at the electrolyte membrane extends along opposing pairs of the plurality of unit cells of the membrane electrode assembly.

3. The water recovery system of claim 1, wherein the membrane electrode assembly comprises a plurality of unit cells, and the slit formed at the electrolyte membrane is formed along an outer edge of the plurality of unit cells of the membrane electrode assembly.

4. The water recovery system of claim 1, wherein the second member comprises another main member corresponding to the slit and a plurality of other side members extending perpendicularly to the other main member at opposite sides of the other main member.

5. The water recovery system of claim 1, wherein
    the first and/or second supporting plates further comprise grooves in which the side members are inserted; and
    the first and second supporting plates further comprise protruded guides that guide the main members.

6. The water recovery system of claim 5, wherein the first supporting plate comprises paths to pass external air, and the paths do not directly contact the grooves.

7. The water recovery system of claim 5, wherein the second supporting plate comprises paths to pass a fuel, and the paths do not directly contact the grooves.

8. The water recovery system of claim 1, wherein the first and second supporting plates are hydrophobic members or nonconductive metals, and the first and second members are formed of a porous material.

9. A direct liquid feed fuel cell having a water recovery system, comprising:
    a membrane electrode assembly having an electrolyte membrane, a plurality of anode electrodes and cathode electrodes corresponding to each other respectively formed on opposite sides of the electrolyte membrane, and
    a water recovery system that supplies water recovered from the cathode electrode to the anode electrode of the membrane electrode assembly, wherein the water recovery system comprises:
    a first member comprising a main member extending in a lengthwise direction to the membrane electrode assembly, and a plurality of side members, each side member extending at opposite sides of the main member and in a perpendicular direction to the main member, the first member absorbing water produced at the cathode electrode, and the first member being located on the cathode electrode;
    a first supporting plate that supports the first member;
    a second member supplying the water produced at the cathode electrode to the anode electrode, and the second member being located on the anode electrode; and
    a second supporting plate that supports the second member,
    wherein the first member and the second member directly contact each other through a slit formed in the electrolyte membrane of the membrane electrode assembly,
    wherein the first member transfers the water produced at the cathode electrode to the second member,
    wherein the main member is disposed in the slit formed on the electrolyte membrane of the membrane electrode assembly, and further comprising an air penetration membrane on the first supporting plate, the air penetration membrane allows air to pass through but does not allow water produced at the cathode electrode to flow to an outside.

10. The direct liquid feed fuel cell of claim 9, wherein the membrane electrode assembly comprises a plurality of unit cells and the slit formed at the electrolyte membrane extends along opposing pairs of the plurality of unit cells of the membrane electrode assembly.

11. The direct liquid feed fuel cell of claim 9, wherein the second member comprises another main member corresponding to the slit and a plurality of other side members extending perpendicularly to the other main member at opposite sides of the other main members.

12. The direct liquid feed fuel cell of claim 11, wherein
the first and/or second supporting plates further comprise grooves in which the side members are inserted; and
the first and second supporting plates further comprise protruded guides that guide the main members.

13. The direct liquid feed fuel cell of claim 12, wherein the first supporting plate comprises paths to pass external air, and the paths do not directly contact the grooves.

14. The direct liquid feed fuel cell of claim 12, wherein the second supporting plate comprises paths to pass a fuel, and the paths do not directly contact the grooves.

15. The direct liquid feed fuel cell of claim 9, wherein the first and second supporting plates are hydrophobic members or nonconductive metals, and the first and second members are formed of a porous material.

16. The direct liquid feed fuel cell of claim 9, wherein a fuel supplied to the anode is methanol.

* * * * *